United States Patent
Mizutani

(10) Patent No.: US 7,511,393 B2
(45) Date of Patent: Mar. 31, 2009

(54) MOTOR AND BRUSH HOLDER THEREOF

(75) Inventor: Nobuo Mizutani, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 435 days.

(21) Appl. No.: 11/409,982

(22) Filed: Apr. 25, 2006

(65) Prior Publication Data

US 2006/0244321 A1 Nov. 2, 2006

(30) Foreign Application Priority Data

Apr. 28, 2005 (JP) ............................. 2005-133455

(51) Int. Cl.
*H02K 11/00* (2006.01)
(52) U.S. Cl. .................... 310/68 R; 310/51; 310/71; 310/239
(58) Field of Classification Search .................. 310/51, 310/71, 68 R, 239, 83, 93
See application file for complete search history.

(56) References Cited

U.S. PATENT DOCUMENTS

| | | | | |
|---|---|---|---|---|
| 4,384,223 A | * | 5/1983 | Zelt | 310/68 R |
| 5,194,769 A | * | 3/1993 | Ade et al. | 310/51 |
| 6,580,194 B2 | * | 6/2003 | Mizutani et al. | 310/239 |
| 6,653,754 B2 | * | 11/2003 | Uchida et al. | 310/51 |
| 6,768,243 B1 | * | 7/2004 | Yamazaki et al. | 310/239 |
| 6,992,414 B2 | * | 1/2006 | Thomson et al. | 310/71 |
| 7,038,337 B2 | * | 5/2006 | Thomson et al. | 310/71 |
| 2002/0030414 A1 | * | 3/2002 | Mizutani et al. | 310/51 |
| 2002/0105246 A1 | * | 8/2002 | Ooyama | 310/239 |

FOREIGN PATENT DOCUMENTS

JP A-2004-56896 2/2004

* cited by examiner

*Primary Examiner*—Thanh Lam
(74) *Attorney, Agent, or Firm*—Posz Law Group, PLC

(57) ABSTRACT

A brush holder of a motor is provided with a holder body portion and a connector portion, which are integrally formed from a resin. The holder body portion is installed in a yoke housing of the motor to hold a brush to be in slide contact with a commutator. The connector portion is connected with an external connector to energize an armature. A grounding terminal is embedded in brush holder to extend from the holder body portion to the connector portion to be connected to a grounding line of the external connector. A capacitor is installed on the holder body portion to connect a point on a power supply terminal between the connector portion and the brush to the grounding terminal.

7 Claims, 5 Drawing Sheets

US 7,511,393 B2

MOTOR AND BRUSH HOLDER THEREOF

CROSS REFERENCE TO RELATED APPLICATION

This application is based upon and claims the benefit of priority of Japanese Patent Application No. 2005-133455 filed on Apr. 28, 2005, the content of which is incorporated herein by reference.

FIELD OF THE INVENTION

The present invention relates to a brush holder of a motor, which installs a capacitor thereon to suppress electromagnetic noises due to a slide contact of a brush, and the motor having the brush holder.

BACKGROUND OF THE INVENTION

Geared motors are used as driving power source of a power window apparatus, a sunroof apparatus, etc. of vehicles. The geared motor has a motor portion in which a rotation shaft and an armature having a commutator are rotatably installed in a yoke housing, and a speed reduction portion in which a speed reduction mechanism for decelerating a rotation of the output shaft of the motor portion is installed in a gear housing. It is desirable to suppress an electromagnetic noise that is generated by a sliding contact of brushes on a commutator, when the motor is used in the power window apparatus, the sunroof apparatus, etc. for vehicles.

JP-2004-56896-A and its counterpart US-2004-0012296-A1, for example, disclose a motor that has a capacitor therein to suppress this electromagnetic noise. Each of a pair of power supply lines, that is, a pair of brushes of the motor, is provided with a capacitor. One terminals of the capacitors are connected to the power supply lines. The other terminals of the capacitors are connected to the yoke housing of the motor to establish groundings.

The yoke housing, however, is not necessarily grounded to a vehicle body, to connect the other terminal of the capacitor only to the yoke housing. That is, the member, to which the capacitor is grounded, is small, so that the capacitor cannot efficiently suppress the electromagnetic noise. Therefore, it is considered to improve the noise suppressing performance of the capacitor.

SUMMARY OF THE INVENTION

The present invention is achieved in view of the above-described issues, and has an object to provide a motor that has a brush holder, which installs a capacitor thereon, and the brush holder of the motor, which can efficiently suppress electromagnetic noises.

The motor has an armature, a yoke housing, a brush holder, a grounding terminal and a capacitor. The armature has a rotation shaft and a commutator. The yoke housing houses the armature to be rotatable about the rotation shaft. The brush holder is provided with a holder body portion and a connector portion, which are integrally formed from a resin. The holder body portion is installed in the yoke housing to hold a brush to be in slide contact with the commutator. The connector portion is connected with an external connector to energize the armature. The grounding terminal is embedded in brush holder to extend from the holder body portion to the connector portion to be connected to a grounding line of the external connector. The capacitor is installed on the holder body portion to connect a point on a power supply terminal between the connector portion and the brush to the grounding terminal.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
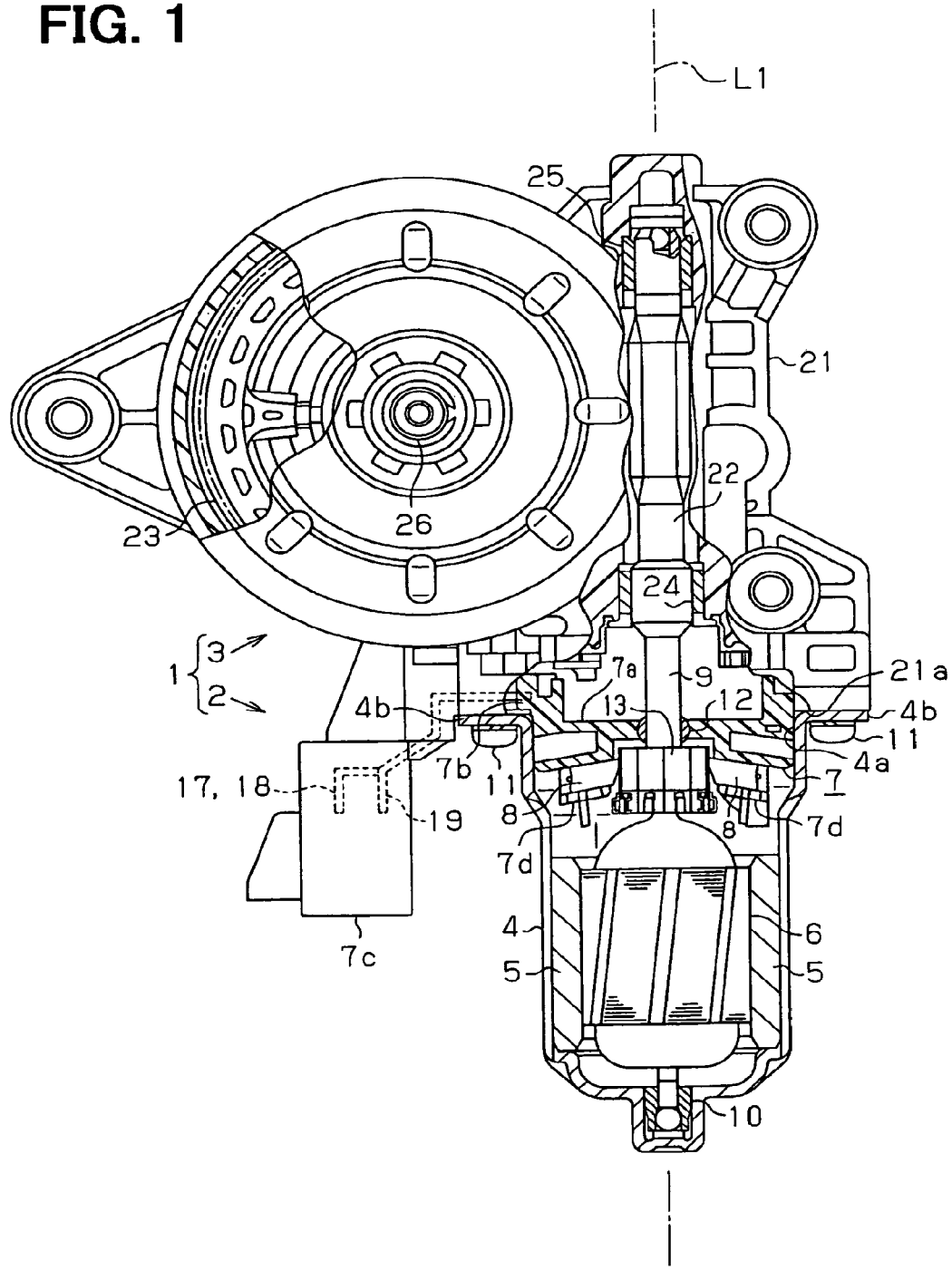
FIG. 1 is a cross-sectional view of a motor according to an embodiment of the present invention.

FIG. 1 depicts a motor 1 according to the present embodiment. The motor 1 is used as a driving power source of a power window apparatus that is mounted on a vehicle. The motor 1 has a motor portion 2 and a speed reduction portion 3. The motor portion 2 includes a yoke housing 4, a pair of magnets 5, an armature 6, a brush holder 7 and a pair of brushes 8.

The yoke housing 4 has a cup-like shape with a bottom. A pair of magnets 5 are fixed on an inner circumferential face of the yoke housing 4. The armature 6 is rotatably installed between the magnets 5. The armature 6 has a rotation shaft 9. A base end portion of the rotation shaft 9 is rotatably supported by a bearing 10, which is installed on a center of a bottom portion of the yoke housing 4.

Figure 2:
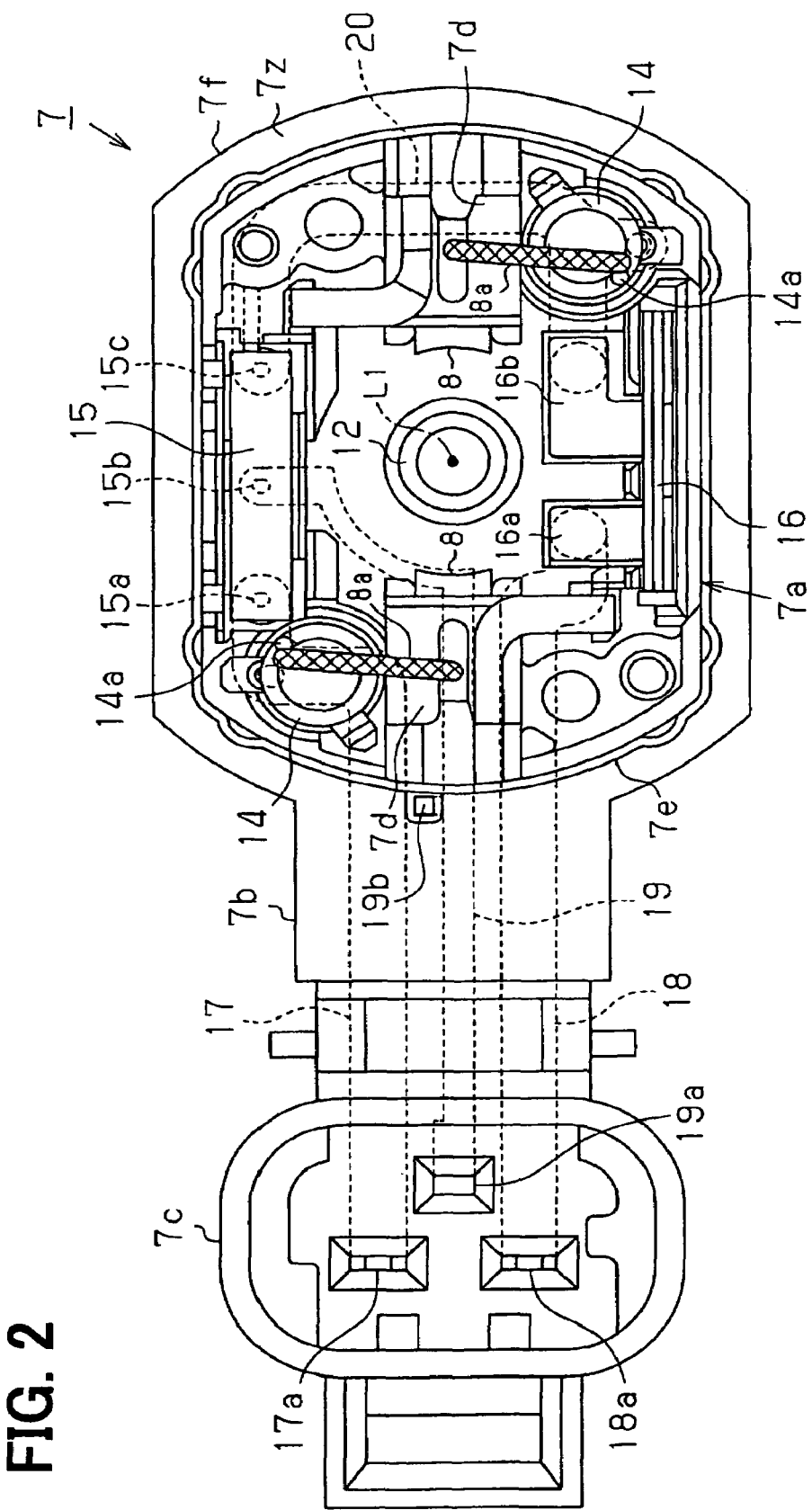
FIG. 2 is a plan view of a brush holder of the motor according to the embodiment, which is seen from a side of a motor portion.
Figure 3:
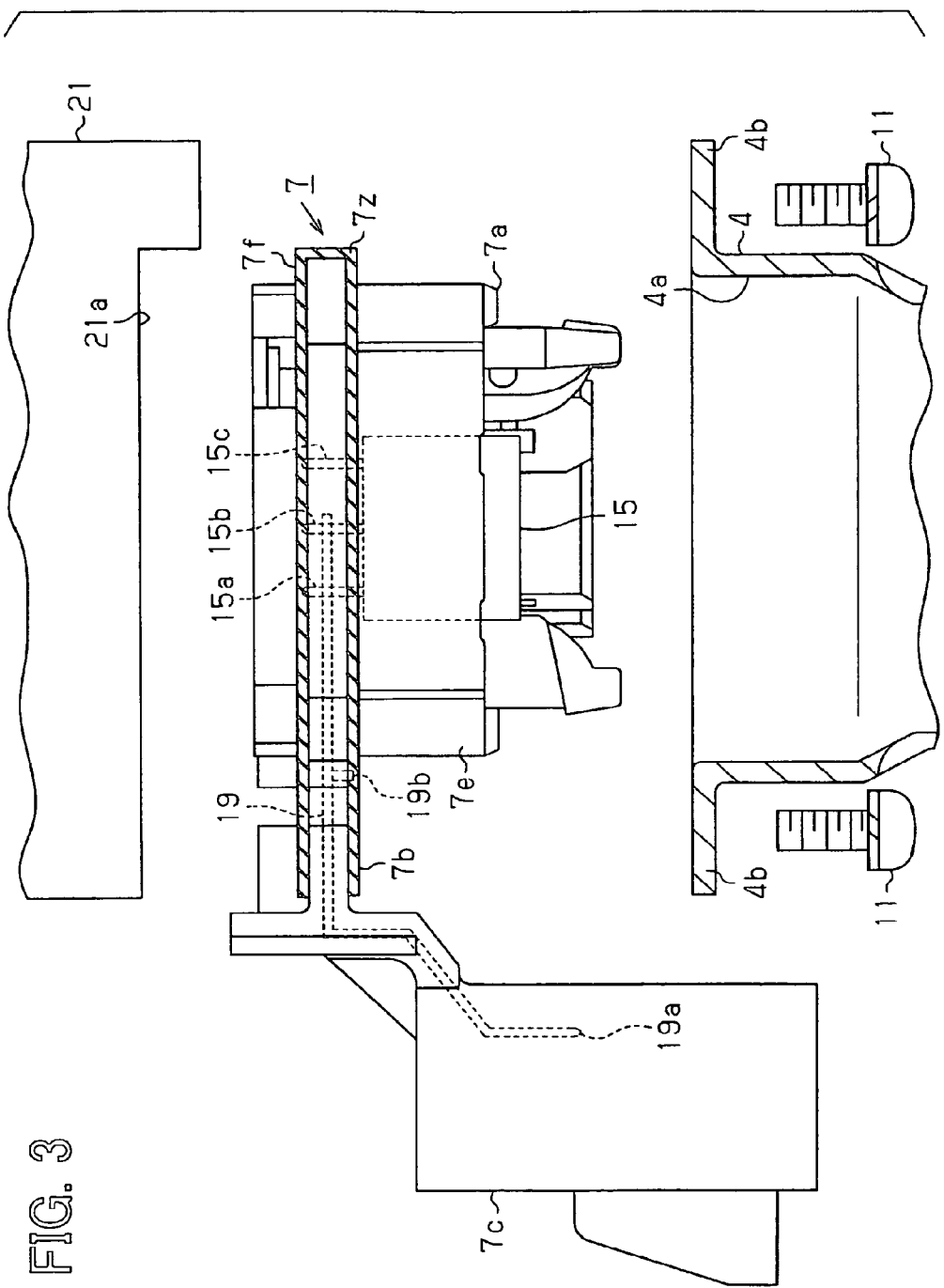
FIG. 3 is a side view of the brush holder of the motor according to the embodiment.

A pair of flange portions 4b extends radially outward from an opening portion 4a of the yoke housing 4. The yoke housing 4 is fixed at the flange portions 4b on a gear housing 21, which is described below, with screws 11. A brush holder 7, which is shown in FIGS. 2 and 3, is clamped between the opening portion 4a, specifically the flange portions 4b of the yoke housing 4 and an opening portion 21a of the gear housing 21. FIG. 2 is a plan view of the brush holder 7 seen from a side of the motor portion 2, and FIG. 3 is a side view of the brush holder 7.

The brush holder 7 is formed from resin. Specifically, the brush holder 7 has a holder body portion 7a, an extension portion 7b and a connector portion 7c that are integrally formed from resin. The holder body portion 7a has an approximately planar and circular shape to be fitted in the opening portion 4a of the yoke housing 4. The extension portion 7b extends radially outward from the holder body portion 7a. The connector portion 7c is exposed from the extension portion 7b to an outside of the motor 1, to establish an electric connection between the motor 1 and an external device.

A bearing 12 is installed on a center of the holder body portion 7a. The bearing 12 rotatably supports a specific portion of the rotation shaft 9. A pair of brush holding portions 7d are formed on one side face of the holder body portion 7a, which is at a side of the motor portion 2. The brush holding portions 7*d* face with each other in a longitudinal direction of the holder body portion 7*a*, to sandwich a center axis L1 of the motor portion 2, that is, the motor portion 2 therebetween. Each of the brush holding portions 7*d* holds one or the other of the brushes 8. The brushes 8 are in slide contacts with a commutator 13, which rotates integrally with the rotation shaft 9, to supply electric current to the commutator 13.

As shown in FIG. 2, a pair of choke coils 14 are installed at two corner positions on the one side face of the holder body portion 7*a*, to sandwich the center axis L1 therebetween. Each of the choke coils 14 has an approximately cylindrical shape. The choke coils 14 and a capacitor 15, which is described below, suppress an electromagnetic noise due to the slide contacts of the brushes 8 with the commutator 13. One side terminals 14*a* of the choke coils 14 are connected to pigtails 8*a*, which extend from the brushes 8. The other side terminals (not shown) of the choke coils 14 penetrate to the other side face of the holder body portion 7*a* in a state that the choke coils 14 are installed on the holder body portion 7*a*. The other side terminal of one choke coil 14 is connected to a connection portion of a first terminal 17, which is exposed on the other side face of the holder body portion 7*a* as described below. The other side terminal of the other choke coil 14 is connected to a connection portion of a fourth terminal 20, which is exposed on the other side face of the holder body portion 7*a* as described below.

Further, a capacitor 15 and a circuit breaker 16 are installed on the one side face of the holder body portion 7*a*, which is at the side of the motor portion 2. The capacitor 15 and the circuit breaker 16 sandwich the center axis L1 to face each other in a direction approximately perpendicular to the longitudinal direction of the holder body portion 7*a* in which the brushes 8 faces each other. The capacitor 15 has an approximately rectangular shape, and longitudinal directions of the capacitor 15 and the circuit breaker 16 are arranged along the longitudinal direction of the holder body portion 7*a*. The capacitor 15 is for suppressing the electromagnetic noise. The circuit breaker 16 is for protecting an electric circuit of the motor 1 from over current.

The capacitor 15 is a three-terminal capacitor that has three connection terminals 15*a*-15*c*, which is suitable for suppressing high frequency electromagnetic noises. The three connection terminals 15*a*-15*c* of the capacitor 15 are arranged along the longitudinal direction of the capacitor 15, that is, along the longitudinal direction of the holder body portion 7*a*. A middle connection terminal 15*b*, which is between the other two connection terminals 15*a*, 15*c*, serves as a grounding terminal. The connection terminals 15*a*-15*c* penetrate to the other side face of the holder body portion 7*a* in a state that the capacitor 15 is installed on the holder body portion 7*a*. The connection terminal 15*a* is connected to the connector portion of the first terminal 17, which is exposed on the other side face of the holder body portion 7*a* as described below. The connection terminal 15*c* is connected to the connection portion of the fourth terminal 20, which is exposed on the other side face of the holder body portion 7*a* as described below. The connection terminal 15*b*, which serves as the grounding terminal, is connected to a connection portion of a third terminal 19, which is exposed on the other face of the holder body portion 7*a* as described below.

The circuit breaker 16 has two connection terminals 16*a*, 16*b*. A connection portion of a second terminal 18 and the connection portion of the fourth terminal 20, which are described below, are exposed on the one side face of the holder body portion 7*a*, which is at the side of the motor portion 2, in a position in which the circuit breaker 16 is installed. The connection terminals 16*a*, 16*b* of the circuit breaker 16 are connected to the connection portions of the second and fourth terminals 18, 20.

The first to fourth terminals 17-20 are embedded in the holder body portion 7*a*, the extension portion 7*b* and the connector portion 7*c* of the brush holder 7 by insert molding. The first to fourth terminals 17-20 are metal plates that forms electric paths between the brushes 8 held by the holder body portion 7*a* and the connector portion 7*c*. Each of the first to third terminals 17-19 extends from the connector portion 7*c* via the extension portion 7*b* to the specific positions on the holder body portion 7*a*. The first to third terminals 17-19 are arranged in parallel with each other in the extension portion 7*b*. The first and second terminals 17, 18, which serve as power supply terminals, are arranged on both sides of the third terminal 19, which serves as a grounding terminal. That is, the third terminal 19 is located between the first and second terminals 17, 18. The fourth terminal 20, which forms a middle portion of the electric paths, is embedded in an end portion of the holder body portion 7*a* opposite from the extension portion 7*b* by insert molding.

The first to fourth terminals 17-20 are exposed at specific positions on the holder body portion 7*a*. Specifically, the first terminal 17 has the connection portion in a portion in which the other side terminal (not shown) of the one choke coils 14, which is closer to the extension portion 7*b*, and the connection terminal 15*a* of capacitor 15, which is closest to the extension portion 7*b*, are located. The connection portion of the first terminal 17 is exposed on the other side face of the holder body portion 7*a*. The second terminal 18 has the connection portion in a portion in which one connection terminal 16*a* of the circuit breaker 16, which is closer to the extension portion 7*b*, is located. The connection portion of the terminal 18 is exposed on the one face of the holder body portion 7*a*, which is at the side of the motor portion 2. The third terminal 19 has the connection portion in a position in which the middle connection terminal 15*b* of the capacitor 15 is located. The connection portion of the third terminal 19 is exposed on the other side face of the holder body portion 7*a*.

The fourth terminal 20 has the connection portion that is exposed on the other side of the holder body portion 7*a*, in a position in which the connection terminal 15*c* of the capacitor 15, which is farthest from the extension portion 7*b*, and the other side terminal (not shown) of the other choke coil 14, which is farther from the extension portion 7*b*, are located. The fourth terminal 20 has another connection portion that is exposed on the one side face of the holder body portion 7*a*, which is at the side of the motor portion 2, in a position in which the other connection terminal 16*b* of the circuit breaker 16, which is farther from the extension portion 7*b*, is located. These first to fourth terminals 17-20 are connected to the choke coils 14, the capacitor 15 and the circuit breaker 16 at the above-mentioned connection portions.

The first to third terminals 17-19 is exposed also in the connector portion 7*c* to provide terminal pins 17*a*-19*a*. Thus, the first to third terminals 17-19 are electrically connected with an external connector (not shown) at the terminal pins 17*a*-19*a*.

As shown in FIGS. 2 and 3, a yoke connecting portion 19*b* protrudes from a middle portion of the third terminal 19, which serves as a grounding terminal. The yoke connecting portion 19*b* is connected with the yoke housing 4. The yoke connecting portion 19*b* is exposed on the extension portion 7*b* of the brush holder 7 in a proximity to an outer wall portion 7*e* of the holder body portion 7*b* at a side of the motor portion 2, that is, at the side of the yoke housing 4. The yoke connecting portion 19*b* is exposed to face the flange portion 4*b*, on which the yoke housing 4 is fixed, in an axial direction of the rotation shaft 9, i.e., in a direction of the center axis L1.

Figure 4:
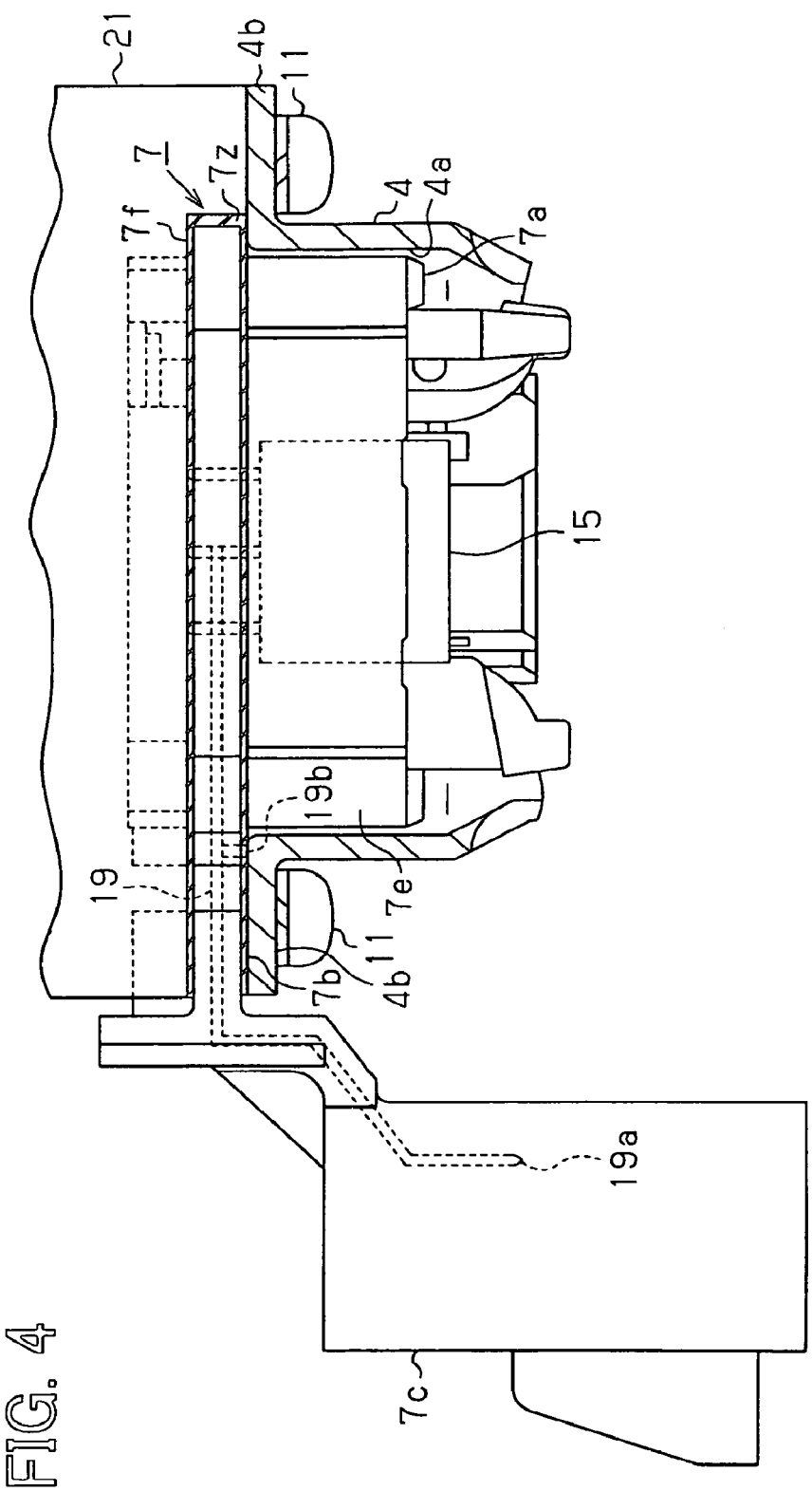
FIG. 4 is a side view of the brush holder of the assembled motor according to the embodiment.

A flange portion 7f is formed along an outer circumference of the holder body portion 7a. The flange portion 7f extends radially outward from the holder body portion 7a, to be continuous from the extension portion 7b. The flange portion 7f is clamped between the opening portion 4a of the yoke housing 4 and the opening portion 21a of the gear housing 21. A seal member 7z, which is formed from elastomer resin and the like, coats a surface of the flange portion 7f and the extension portion 7b. In a state that the yoke housing 4 is fixed to the gear housing 21 as shown in FIG. 4, the seal member 7z is compressed by the opening portions 4a, 21a to be in intimate contact with the opening portions 4a, 21a.

As shown in FIG. 3, a leading end portion of the yoke connecting portion 19b is slightly retracted from a surface of the seal member 7z in accordance with a compression amount of the seal member 7z in an assembled state of the motor 1. In the state that the yoke housing 4 is fixed on the gear housing 21 to compress the seal member 7z by the opening portions 4a, 21a, the yoke connecting portion 19b comes in physical and electrical contact with the flange portions 4b of the yoke housing 4 as shown in FIG. 4. The third terminal 19, which is provided with the yoke connecting portion 19b, serves a grounding terminal, so that the yoke housing 4, which is connected with the yoke connecting portion 19b, is grounded.

As described above, the leading end portion of the yoke connecting portion 19b is retracted from the surface of the seal member 7z before the assembled state, to correspond with the compression amount of the seal member 7z in the assembled state. Thus, the yoke connecting portion 19b does not interfere with the compression of the seal member 7z in fixing the yoke housing 4 on the gear housing 21. That is, the seal member 7z smoothly comes in intimate contact with the opening portion 4a of the yoke housing 4, to secure fine seal performance.

Figure 5:
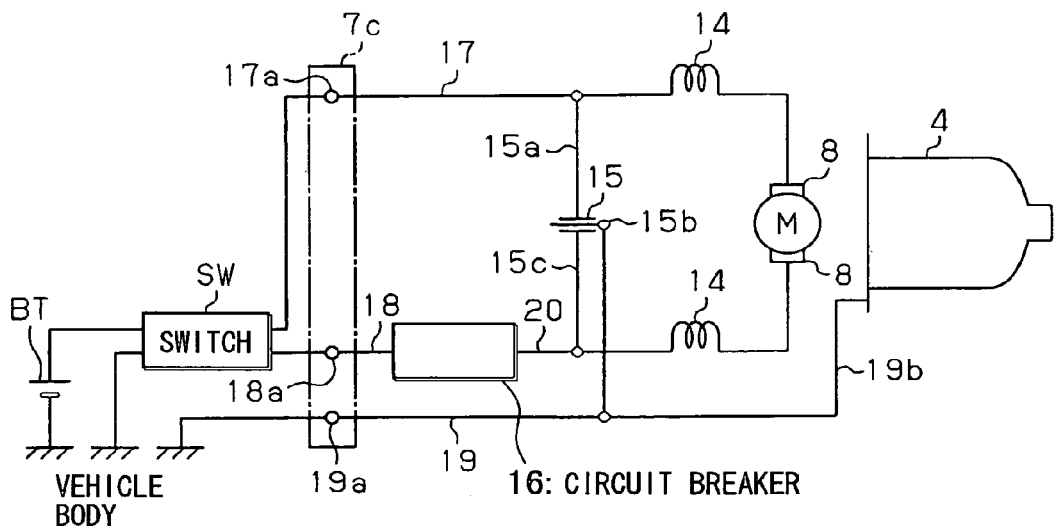
FIG. 5 is a block diagram showing an electric circuit construction of the motor according to the embodiment.

The choke coils 14, the capacitor 15 and the circuit breaker 16 are connected to the first to fourth terminals 17-20 to establish an electrical connection as shown in FIG. 5. In the connector portion 7c, the terminal pins 17a, 18a of the first and second terminals 17, 18 are for electric power supply, and the terminal pin 19a of the third terminal 19 is for grounding.

The terminal pin 17a for electric power supply is connected via the one choke coil 14 to the one brush 8. The terminal pin 18a for electric power supply is connected via the circuit breaker 16 and the other choke coils 14 to the other brush 8. Terminal pins 17a, 18a for electric power supply are connected to the connection terminals 15a, 15c of the capacitor 15. The terminal pin 19a for grounding is connected to the connection terminal 15b of the capacitor 15, which serves as a grounding terminal, and connected via the yoke connecting portion 19b to the yoke housing 4.

The connector portion 7c is connected with an external connector (not shown), so a battery BT supplies electric power via a switch SW to the terminal pins 17a, 18a for electric power supply. The switch SW is one that can switch a polarity of electric power source to drive the motor portion 2 of the motor 1 in a normal and reverse rotational directions. That is, a switching operation of the switch SW connects the terminal pin 17a to a positive electrode of the battery BT to drive the motor 1 in the normal rotational direction. The switching operation of the switch SW connects the terminal pin 18a to the positive electrode of the battery BT to drive the motor 1 in the reverse rotational direction.

A control unit for controlling the motor 1, for example, connects the terminal pin 19a for grounding via the external connector, which is connected with the connector portion 7c, to a vehicle body, to establish body grounding. Accordingly, the grounding terminal 15b of the capacitor 15 is grounded to the vehicle body that is much larger than the yoke housing 4, so that the choke coils 14 and the capacitor 15 efficiently suppress the electromagnetic noise caused by the slide contact of the brushes 8 on the commutator 13. In this case, the yoke housing 4 is grounded, so that an electromagnetic shielding effect of the yoke housing 4 is improved to decrease a radiation of the electromagnetic noise out of the yoke housing 4. Further, the capacitor 15 is a three-terminal capacitor, to suppress high frequency electromagnetic noises efficiently.

The speed reduction portion 3, which decelerates a rotation of the motor portion 2, includes a gear housing 21, a worm shaft 22 and a worm wheel 23. The gear housing 21 is formed from resin in a specific shape to house the worm shaft 22 and the worm wheel 23 therein. The gear housing 21 has the opening portion 21a, which faces the opening portion 4a of the yoke housing 4 and the flange portions 7b of the brush holder 7. The gear housing 21 and the yoke housing 4 are fixed on each other by the screws 11 to clamp the brush holder 7 therebetween.

The worm shaft 22 is coupled to the rotation shaft 9 of the motor 1, and rotatably supported by bearings 24, 25, which are installed in specific positions in the gear housing 21. The worm shaft 22 is engaged with the worm wheel 23. The worm wheel 23 is solidly coupled to an output shaft 26, which is arranged perpendicularly to the worm shaft 22. The output shaft 26 is solidly coupled to an X-shaped arm regulator (not shown), which is for opening and closing a window glass (not shown). The output shaft 26 rotates in a normal and reverse directions to move the regulator to open and close the window glass, in accordance with the normal and reverse rotations of the rotation shaft 9 driven by the motor portion 2.

Actions and effects of the motor 1 according to the present embodiment are described in the following.

(1) In the motor 1 according to the present embodiment, the brush holder 7 has the holder body portion 7a for holding the brushes 8, and the connector portion 7c for establishing the electric connection between the motor 1 and the external device, which are integrally formed from resin. Further, the holder body portion 7a installs the capacitor 15 thereon to connect the electric power source to the ground between the connector portion 7c and the brushes 8. The capacitor 15 is provided with the connection terminal 15b for grounding. The third terminal 19, which is for grounding and connected to the grounding terminal 15b of the capacitor 15, is embedded in the brush holder 7 to extend from the holder body portion 7a to the connector portion 7c to establish the electric connection with the external device. The external device such as the control unit for controlling the motor 1 is securely grounded to the vehicle body, so that the third terminal 19 for grounding in the connector portion 7c securely connects the grounding terminal 15b of the capacitor 15 to the ground, to suppress the noise efficiently.

(2) The first and second terminals 17, 18, which are for supplying electric power from the connector portion 7c to the brushes 8, are embedded in the brush holder 7 to extend from the holder body portion 7a to the connector portion 7c. The fourth terminal 20 is embedded in the holder body portion 7a of the brush holder 7. Further, the third terminal 19 for grounding is embedded in the brush holder 7. That is, the third terminal 19 for grounding is embedded not independently but together with the first, second and fourth terminals 17, 18, 20 for electric power supply. Thus, it is possible to embed the third terminal 19 for grounding by insert molding together with the first, second and fourth terminals 17, 18, 20 for electric power supply.

(3) The third terminal 19 for grounding has the yoke connecting portion 19b that is exposed in the extension portion 7b of the brush holder 7, which comes in contact with the flange portion 4b of the yoke housing 4. The contact between the yoke connecting portion 19b and the yoke housing 4 establishes the grounding of the yoke housing 4. Accordingly, the electromagnetic shielding effect of the yoke housing 4 is improved, to suppress the radiation of the electromagnetic noise out of the yoke housing 4 efficiently.

(4) The brush holder 7 is provided with the seal member 7z in a portion that is clamped between the opening portions 4a, 21a of the yoke housing 4 and the gear housing 21. The yoke connecting portion 19b is exposed in a portion that is clamped by the yoke housing 4, to be retracted from the surface of the seal member 7z in the state before the yoke housing 4 and the gear housing 21 are fixed on each other, in accordance with the compression amount of the seal member 7z in the assembled state of the motor 1. Thus, the yoke connecting portion 19b does not interfere with the compression of the seal member 7z, so that the seal member 7z cam smoothly come in intimate contact with the yoke housing 4, to secure fine seal performance.

(5) The capacitor 15 is a three-terminal capacitor that is suitable for suppressing high frequency electromagnetic noises, so that the capacitor 15 effectively suppresses the electromagnetic noise.

(6) The motor 1 according to the present embodiment is used in a power window apparatus in which the motor 1 drives in the normal and reverse directions to open and close the window glass of the vehicle. Thus, the power supply lines of the motor 1, which rotates in both the normal and reverse directions, are alternately switched between a positive and negative electrode sides, so that it is impossible to use a grounding line also as one of the power supply lines. Thus, it is effective to provide the motor 1 with the terminal 19 for grounding. Further, it is desirable to suppress the electromagnetic noises in vehicles, so that it is effective to provide the motor 1 with the terminal 19 for grounding.

The motor 1 according to the present embodiment may be modified as follows.

Figure 6:
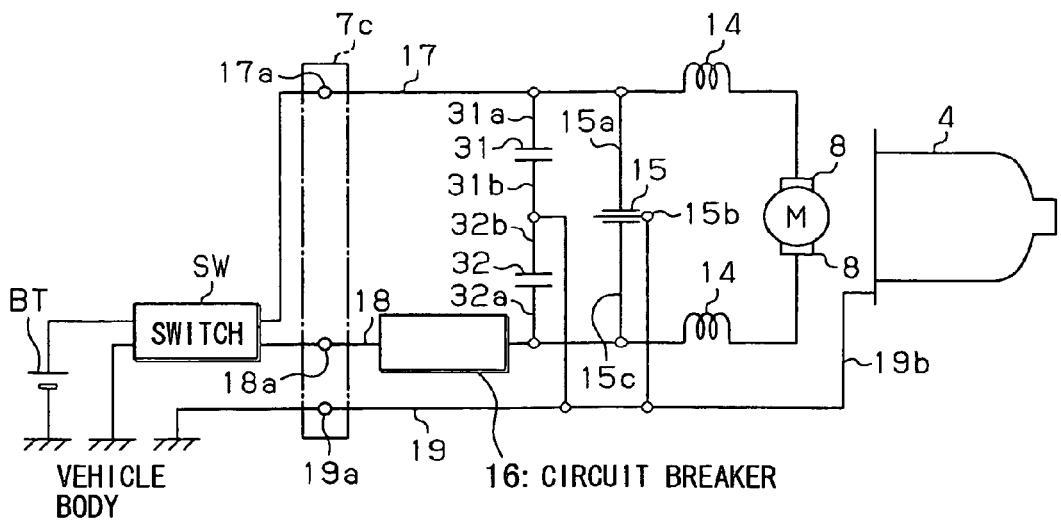
FIG. 6 is a block diagram showing an electric circuit construction of a motor according to another embodiment of the present invention.

In the above-described embodiment, the capacitor 15 of the motor 1 is a three-terminal capacitor. Alternatively, the motor according to the present invention may have other kind of a capacitor or a combination of capacitors. As shown in FIG. 6, for example, two two-terminal capacitors 31, 32 may be added in addition to the three-terminal capacitor 15, to connect one connection terminals 31a, 32a of the two-terminal capacitors 31, 32 to the power supply lines, i.e., the first and second terminals 17, 18 for electric power supply and the other connection terminals 31b, 32b of the two-terminal capacitors 31, 32 to the grounding lines, i.e., the third terminal 19 for grounding. By this construction, a three-terminal capacitor 15 effectively suppressed high frequency component of the electromagnetic noise, and the two-terminal capacitors 31, 32 generally suppress the electromagnetic noise. Accordingly, it is possible to suppress the electromagnetic noise more effectively.

In the above-described embodiment, the yoke connecting portion 19b is exposed in the extension portion 7b of the brush holder 7 to face the flange portions 4b of the yoke housing 4. However, the motor according to the present invention is not limited to this construction. For example, the yoke connecting portion 19b may be exposed on the outer wall portion 7e pf the holder body portion 7a to come in contact with an inner side face of face the yoke housing 4. By this construction, it is possible to design the motor without a consideration of the compressive deformation of the seal member 7z. Further, it is possible to eliminate the yoke connecting portion 19b in a case that it is not necessary to connect the yoke housing 4 to ground.

In the above-described embodiment, the motor according to the present invention is used in the motor 1 that rotates in both the normal and reverse directions. However, it is also effective to use the motor according to the present invention for a motor that rotates exclusively in one direction.

In the above-described embodiment, the motor according to the present invention is used in the motor 1 of the power window apparatus. However, it is also possible to use the motor according to the present invention in the other kinds of apparatus other than power window apparatus that is mounted on vehicles. For example, the motor according to the present invention can be used for a motor of a sunroof apparatus for opening and closing a roof element such as a roof panel or roof glass of vehicles. It is effective to use the motor according to the present invention for a motor of sunroof apparatus, which has a construction similar to that of the motor 1 of the above-described power window apparatus. The motor according to the present invention may be used for motors that are used as driving power for apparatuses for other than vehicular ones.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor comprising:
   an armature that has a rotation shaft and a commutator;
   a yoke housing that houses the armature to be rotatable about the rotation shaft;
   a brush holder provided with a holder body portion that is installed in the yoke housing to hold a brush to be in slide contact with the commutator, and a connector portion that is connected with an external connector to energize the armature, the holder body portion and the connector portion integrally formed from a resin;
   a grounding terminal that is embedded in brush holder to extend from the holder body portion to the connector portion to be connected to a grounding line of the external connector; and
   a capacitor that is installed on the holder body portion to connect a point on a power supply terminal between the connector portion and the brush to the grounding terminal.

2. The motor according to claim 1, wherein the power supply terminal is embedded in the brush holder to extend from the holder body portion to the connector portion.

3. The motor according to claim 1, wherein the grounding terminal has a yoke connecting portion which is not covered by the brush holder to be in contact with the yoke housing.

4. The motor according to claim 3, further comprising:
   a speed reduction gears that decelerates a rotation of the rotation shaft; and
   a gear housing that houses the speed reduction gears and is connected to the yoke housing,
   wherein: the brush holder is further provided with a seal member that is formed from an elastic body clamed in a connection portion of the yoke housing and the gear housing and is formed from an elastic body to securely seal the connection portion; and
   the yoke connecting portion is retracted from a surface of the seal member in accordance with a compression amount of the seal member clamped in the connection portion.

5. The motor according to claim 1, wherein the capacitor includes at least a three-terminal capacitor.

6. The motor according to claim 1, further comprising a switch that switches a polarity of the power supply terminal to energize the armature.

7. A brush holder of a motor having a yoke housing that houses an armature to be rotatable about an rotation shaft, and a gear housing that is connected to the yoke housing to house a speed reduction gears for decelerating a rotation of the rotation shaft, the brush holder being provided with:

a holder body portion that is installed in the yoke housing to hold a brush to be in slide contact with the commutator;

a connector portion that is connected with an external connector to energize the armature, the holder body portion and the connector portion being integrally formed from a resin;

a grounding terminal that is embedded in the holder body portion and the connector portion to extend from the holder body portion to the connector portion to be connected to a grounding line of the external connector; and a capacitor that is installed on the holder body portion to connect a point on a power supply terminal between the connector portion and the brush to the grounding terminal.

* * * * *